United States Patent [19]

Suzuki et al.

[11] Patent Number: 5,253,112
[45] Date of Patent: Oct. 12, 1993

[54] REAR CONVERSION LENS

[75] Inventors: Kenzaburo Suzuki, Tokyo; Yoshinari Hamanishi, Wako, both of Japan

[73] Assignee: Nikon Corporation, Tokyo, Japan

[21] Appl. No.: 974,482

[22] Filed: Nov. 12, 1992

[30] Foreign Application Priority Data

Nov. 18, 1991 [JP] Japan .................................. 3-329497

[51] Int. Cl.$^5$ ............................................. G02B 15/08
[52] U.S. Cl. ................................................... 359/675
[58] Field of Search .................................. 359/672, 675

[56] References Cited

U.S. PATENT DOCUMENTS

| 4,340,279 | 7/1982 | Ikemori | 359/675 |
| 4,591,234 | 5/1986 | Hamanishi | 359/675 |

*Primary Examiner*—Scott J. Sugarman
*Attorney, Agent, or Firm*—Shapiro and Shapiro

[57] ABSTRACT

The rear conversion lens of the present invention is compact and maintains an excellent imaging performance even when it is mounted on a telephoto objective lens the enlargement magnification of whose focal length is relatively high, e.g. about double and whose F-number is of the order of 2–2.8, and moreover does not intercept a light beam even in the fully open state of the aperture. The rear conversion lens of the present invention is an RCL adapted to be mounted on the image side of an objective lens and having negative refractive power for enlarging the combined focal length of itself and the objective lens, and has, in succession from the objective lens side, a first lens unit of positive or negative refractive power, a second lens unit of negative refractive power and a third lens unit of positive refractive power, the first lens unit having a positive lens most adjacent to the object side, and when the air gap between the first lens unit and the second lens unit is $D_1$ and the air gap between the second lens unit and the third lens unit is $D_2$ and the on-axis lens thickness from the first surface to the last surface of the RCL is $\Sigma d$ and the focal length of the entire RCL system is $f_R$, the RCL satisfies the following conditions:

$$0.13 < D_1/\Sigma d < 0.25$$

$$0.005 < |D_2/f_R| < 0.05$$

13 Claims, 3 Drawing Sheets

REAR CONVERSION LENS

BACKGROUND OF THE INVENTION

1. Field of the Invention

This invention relates to a rear conversion lens (teleconverter) mounted on the image side of an objective lens to enlarge the focal length of the objective lens, and particularly to a compact rear conversion lens of good imaging performance mountable also on a telephoto objective lens of great focal length.

2. Related Background Art

An objective lens piece such as a photographic lens will not only become expensive if the focal length thereof becomes e.g. double, but also become bulky and heavy in weight in conformity with the focal length and therefore, it involves not a little difficulty for one to carry a plurality of different objective lenses of relatively great focal lengths with one. In contrast, if use is made of a rear conversion lens (hereinafter abbreviated as "RCL") for enlarging the focal length of an objective lens, the focal length of the objective lens can be enlarged to e.g. double simply by mounting a relatively small and inexpensive additional optical system on the image side of the objective lens, and this is advantageous particularly in respect of portability and cost as compared with a plurality of objective lenses of different focal lengths.

Particularly, in case of a telephoto objective lens, if the focal length thereof becomes nearly double, a single-piece lens will encounter bulkiness and a great increase in cost and therefore, the frequency with which it is used in combination with an RCL is relatively high. Also, recently, bright lenses in which F-number is of the order of 2-2.8 have become used as telephoto objective lenses and it has been desired to make the lenses more compact as a whole. Therefore, the copying with a compact and bright telephoto objective lens has also been desired for an RCL.

Generally, however, an RCL enlarges the focal length of an objective lens on which it is to be mounted and at the same time, enlarges the aberrations of the objective lens, and this leads to the inconvenience that the correction of the aberrations is very difficult. Thus, it has been difficult to provide an RCL which is compact and has a sufficient performance to be practically used.

SUMMARY OF THE INVENTION

Accordingly, in view of such points, it is an object of the present invention to provide a compact rear conversion lens which will maintain an excellent imaging performance even if it is mounted on a telephoto objective lens the enlargement magnification of whose focal length is relatively high, e.g. about double, and whose F-number is of the order of 2-2.8, and which will moreover not intercept a light beam even in the fully open state of the aperture.

Also, in an ordinary telephoto objective lens, as compared with a wide-angle objective lens or a standard objective lens, the exit pupil is located relatively far from the image plane. So, taking such a case also into account, it is another object of the present invention to provide a rear conversion lens having a good imaging performance even in the marginal area of the image field.

To achieve the above objects, the RCL according to the present invention is an RCL which is adapted to be mounted on the image side of an objective lens and has negative refractive power for enlarging the combined focal length of itself and the objective lens and which has, in succession from the objective lens side, a first lens unit of positive or negative refractive power, a second lens unit of negative refractive power and a third lens unit of positive refractive power, the first lens unit having a positive lens most adjacent to the object side, and whcih satisfies the following conditions:

$$0.13 < D_1 < \Sigma_d < 0.25$$

$$0.005 < |D_2/f_R| < 0.05,$$

where $D_1$ is the air gap between the first lens unit and the second lens unit, $D_2$ is the air gap between the second lens unit and the third lens unit, $\Sigma_d$ is the on-axis lens thickness from the first surface to the last surface of the RCL, and $f_R$ is the focal length of the entire RCL system.

The rear conversion lens (RCL) according to the present invention is constructed as described above and therefore, is compact and does not intercept a light beam even in the fully open state of the aperture and has a good imaging performance up to the marginal area of the image field and has a relatively high magnification, and yet can be mounted on a bright telephoto objective lens.

Also, when the focal lengths of the first lens unit, the second lens unit and the third lens unit are $f_1$, $f_2$ and $f_3$, respectively, it is desirable that the following conditions be further satisfied:

$$-10 < f_1/f_R < 10$$

$$0.2 < |f_2/f_R| < 0.5$$

$$0.3 < |f_3/f_R| < 1.2$$

Thereby, various aberrations, particularly, spherical aberration, astigmatic difference and curvature of image field can be corrected better.

Other objects, features and effects of the present invention will become fully apparent from the following detailed description taken in conjunction with the accompanying drawings.

DESCRIPTION OF THE PREFERRED EMBODIMENTS

Some embodiments of the present invention will hereinafter be described in detail with reference to the accompanying drawings.

Figure 3:
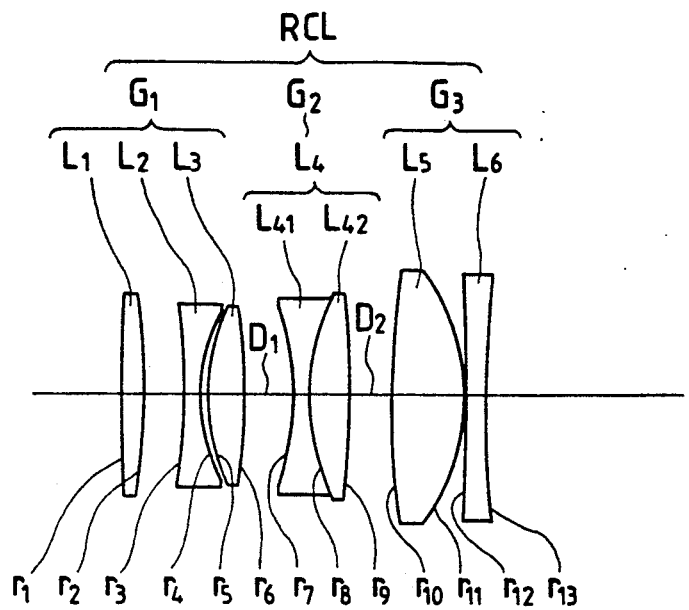
FIG. 3 is a lens construction view showing an RCL according to a third embodiment of the present invention.
Figure 4:
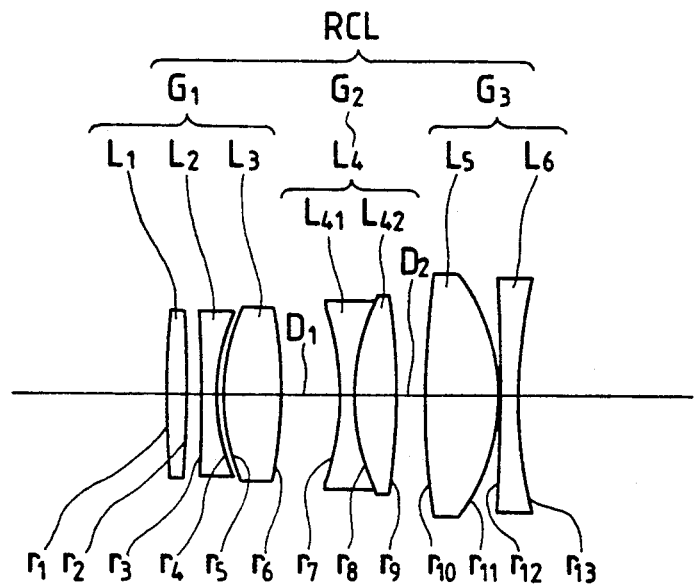
FIG. 4 is a lens construction view showing an RCL according to a fourth embodiment of the present invention.
Figure 5:
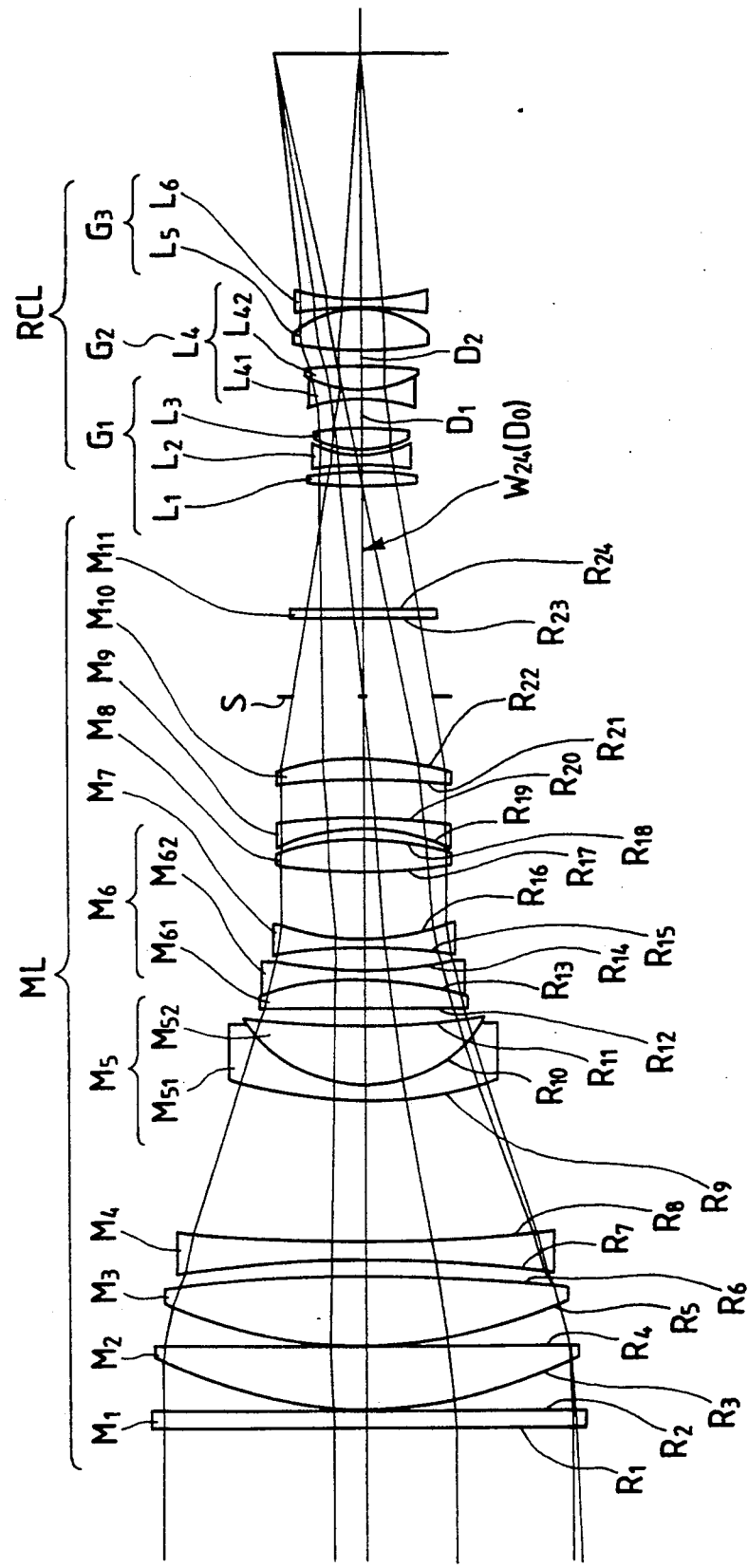
FIG. 5 is a lens construction view showing the construction and optical path of a standard objective lens on which the rear conversion lens (RCL) of the first embodiment shown in FIG. 1 is mounted.

A rear conversion lens (RCL) according to the present invention, as shown in FIG. 5, is a so-called teleconverter adapted to be mounted on the image side of an objective lens ML and having negative refractive power for enlarging the combined focal length of itself and the objective lens ML, and as shown in FIGS. 1 to 4, comprises, in succession from the objective lens side, a first lens unit G1 including a positive lens L1 provided most adjacent to the object side and having positive or negative refractive power as a whole, a second lens unit G2 having negative refractive power, and a third lens unit G3 having positive refractive power, and when the air gap between the first lens unit G1 and the second lens unit G2 is $D_1$ and the air gap between the second lens unit G2 and the third lens unit G3 is $D_2$, it is designed to satisfy the following conditions:

$$0.13 < D_1/\Sigma_d < 0.25 \quad (1)$$

$$0.005 < |D_2/f_R| < 0.05 \quad (2)$$

where
$\Sigma_d$: the on-axis lens thickness from the first surface to the last surface of the RCL;
$f_R$: the focal length of the entire RCL system.

The action of the RCL according to the present invention constructed as described above will now be described.

To make an RCL compact, that is, to shorten the full length of the RCL, it is effective to shorten the focal length $f_R$ of the entire RCL system and make negative refractive power great, and newly regard the intermediate image by an objective lens as an object and shorten the conjugate length which is the distance between the image by the objective lens and the image by the RCL. If in that case, the negative refractive power is made great, Petzval sum will become great to the negative and the bending of the image field will become great. However, the combined exit pupil will become close to the image plane, and not only the quantity of marginal light can be sufficiently secured, but also the lens diameter of the last lens unit can be made small.

Also, in a telephoto objective lens, as compared with a wide-angle lens and a standard lens, the exit pupil plane is far from the image plane. Therefore, to provide a variation in the heights of off-axis light fluxes passing through the first lens unit G1, the second lens unit G2 and the third lens unit G3 to thereby obtain the degree of freedom of aberration correction sufficiently, it is effective to secure the air gaps $D_1$ and $D_2$ between the adjacent lens units greatly as compared with the case of an RCL for a wide-angle lens or a standard lens. However, if those air gaps are secured too greatly, there will readily occur the inconveniences that the full length of the lens becomes great and the back focal length (Bf) cannot be secured sufficiently and that an increase in the lens diameter is caused or the quantity of marginal light decreases. To take such circumstances comprehensively and achieve the compactness as an RCL and keep an excellent imaging performance, it is important to confine the air gaps between the adjacent lens units within appropriate ranges in conformity with the full length and the focal length, as shown in conditions (1) and (2) above. Conditions (1) and (2) will hereinafter be described.

Condition (1) prescribes the spatial disposition of the first lens unit G1 and the second lens unit G2 which becomes necessary when the RCL is mounted on a telephoto objective lens by the ratio thereof to the one-axis lens thickness $\Sigma_d$ of the RCL.

Condition (2) prescribes the spatial disposition of the second lens unit and the third lens unit by the ratio thereof to the magnitude of the focal length $f_R$ of the RCL.

If the upper limit of condition (1) is exceeded, the air gap $D_1$ between the first lens unit G1 and the second lens unit G2 will become long relative to the on-axis lens thickness of the RCL and spherical aberration will become liable to be over-corrected, and extroversive coma will occur excessively in the light flux above the principal ray. Positive astigmatic difference will also become great and the bending of the meridional image plane in the negative (−) direction will become great. If conversely, the lower limit of condition (1) is exceeded, the air gap $D_1$ between the first lens unit G1 and the second lens unit G2 will become short relative to the on-axis lens thickness of the RCL and spherical aberration will become liable to be under-corrected, and introversive coma will occur excessively in the light flux above the principal ray. Positive astigmatic difference will also become great and the bending of the meridional image plane in the positive (+) direction will become great, and the correction of these will be difficult.

If the upper limit of condition (2) is exceeded, the air gap $D_2$ between the second lens unit G2 and the third lens unit G3 will become long relative to the magnitude of the focal length $f_R$ of the RCL and negative astigmatic difference will become very great, and introversive coma will occur in the light flux above the principal ray. Also, the ray height of the off-axis ray passing through the third lens unit G3 will become generally great and therefore, not only it will become difficult to secure the quantity of marginal light, but also an increase in the diameter of the last lens will result. Further, if the upper limit of condition (2) is exceeded, the full length of the RCL will become great and of course, this is against the desire for compactness.

On the other hand, if the lower limit of condition (2) is exceeded, the air gap $D_2$ between the second lens unit G2 and the third lens unit G3 will become short relative to the focal length $f_R$ of the RCL and positive astigmatic difference will become very great, and extroversive coma will occur in the light flux above the principal ray, i.e., in the marginal area of the image field. Also, the position of the principal point of the whole will move toward the object side and therefore, it will become difficult to secure the back focal length.

Further, what can be said in common to condition (1) and condition (2) is that if the lower limits of these conditions are exceeded, as previously described, it will become difficult to provide a variation in the heights of off-axis light fluxes passing through the respective lens units to thereby obtain the degree of freedom of aberration correction.

In addition to such a three-unit construction comprising the positive or negative first lens unit G1, the negative second lens unit G2 and the positive third lens unit G3 and the spatial disposition thereof, it is effective in aberration correction to dispose a positive lens L1 most adjacent to the object side, regarding the construction of the first lens unit G1. Also, extroversive coma liable to occur in the rays above the principal ray can be corrected to the negative side and introversive coma liable to occur in the rays below the principal ray can be corrected to the positive side, whereby a good imaging performance can be obtained. It is desirable that the shape of the positive lens L1 be that of a biconvex lens or a meniscus lens having its convex surface facing the image side.

In the present invention as described above, the exit pupil of the telephoto lens is located far from the RCL and the relative aperture thereof is relatively great and the magnification of the RCL is as high as the order of two times and therefore, the correction of spherical aberration, astigmatic difference and curvature of image field is more difficult than in the prior art, and for the good correction of these, it is desirable that the following conditions (3) to (5) be further satisfied:

$$-10 < f_1/f_R < 10 \qquad (3)$$

$$0.2 < |f_2/f_R| < 0.5 \qquad (4)$$

$$0.3 < |f_3/f_R| < 1.2, \qquad (5)$$

where
$f_1$: the focal length of the first lens unit G1;
$f_2$: the focal length of the second lens unit G2;
$f_3$: the focal length of the third lens unit G3;
$f_R$: the focal length of the entire RCL system.

These conditions are the ratios of the refractive power of the entire RCL system to the refractive powers of the respective lens units of the RCL, and prescribe the appropriate refractive power distribution of the RCL.

If the lower limit of condition (3) is exceeded, the correction of spherical aberration will become difficult and particularly, zonal spherical aberration will become excessively great and it will also become difficult to secure a sufficient back focal length as a lens for a single-lens reflex camera, and this is not desirable. If conversely, the upper limit of condition (3) is exceeded, the refractive power of the third lens unit G3 will become relatively too strong and the correction of astigmatism will become difficult, and this is not desirable.

Also, if the lower limit of condition (4) is exceeded, the correction of positive astigmatism and astigmatic difference will become difficult, and if conversely, the upper limit of condition (4) is exceeded, it will become impossible to secure a sufficient back focal length, and this is not desirable.

Further, if the lower limit of condition (5) is exceeded, negative astigmatism will occur excessively and will be difficult to correct. Also, if the upper limit of condition (5) is exceeded, the correction of positive astigmatism will become difficult and the correction of positive distortion liable to occur in the RCL will also become difficult.

On the other hand, to a telephoto objective lens, the correction of chromatic aberration is important in obtaining a good imaging performance. In the RCL as a teleconverter to be mounted on the image side of the objective lens to obtain an enlarged magnification, it is necessary for the obtainment of a synthetically good imaging performance that chromatic aberration be sufficiently corrected.

For that purpose, with regard to the color dispersion of the glass material forming the lens system according to the present invention, when the lowest value of Abbe number $\nu d$ in the negative lenses constituting the RCL is $\nu-$, it is desirable that the following condition be satisfied:

$$\nu- > 42.5 \qquad (6)$$

However, when the refractive index for d-line (587.6 nm) is nd and the refractive index for F-line (486.1 nm) is $n_F$ and the refractive index for C-line (656.3 nm) is $n_C$, Abbe number $\nu d$ is defined as follows:

$$\nu d = (nd-1)/(n_F - n_C).$$

If the range of condition (6) above is exceeded, the correction of chromatic aberration will become difficult and a good imaging performance will not be obtained.

Also, generally, in a telephoto objective lens wherein aberrations are corrected well, it is usual that Petzval sum is approximate to 0 and assumes a slightly plus (+) value. For example, Petzval sum in a standard objective lens ML used in an embodiment shown in FIG. 5 which will be described later is 0.00027.

However, the RCL itself is a negative lens system and the Petzval sum in it is usually liable to assume a negative value. Accordingly, to obtain a good performance when an objective lens and an RCL are combined together, it is important to confine the Petzval sum of the combined entire system within an appropriate range.

For that purpose, it is necessary to take head of the refractive power distribution in the RCL as well as to take head of the refractive index of lenses constituting the RCL, and when the highest one of the refractive indices nd of the negative lenses constituting the RCL for d-line (587.6 nm) is $n-$, it is desirable that the following condition (7) be satisfied:

$$n- > 1.82 \qquad (7)$$

If this range is exceeded, the value of the Petzval sum of the entire system will become very great in the negative direction relative to the standard objective lens and the correction of the bending of the image plane will become difficult and thus, a good imaging performance will not be obtained.

Further, the positive lens component L1 of the RCL which is most adjacent to the object side is a biconvex lens or a positive meniscus lens having its convex surface facing the image side, and when the radius of curvature of that surface thereof which is adjacent to the object side is $r_1$ and the radius of curvature of that surface thereof which is adjacent to the image side is $r_2$ and the shape factor $q_1$ of the positive lens component L1 is defined as $$q_1(r_2 + r_1)/(r_2 - r_1),$$

it is desirable that the following condition be satisfied:

$$-1.5 < q_1 < 0 \qquad (8)$$

If the shape factor $q_1$ exceeds 0 which is the upper limit of condition (8), not only aspherical aberration will become excessive, but also curvature of image field will also become excessively great and further, extroversive coma will become liable to occur in the light flux above the principal ray, and the correction of these will become difficult. If conversely, the shape factor $q_1$ exceeds 1.5 which is the lower limit of condition (8), not only spherical aberration will become over-corrected, but also curvature of image field will become excessively great toward the negative side and further, introversive coma will become liable to occur in the light flux above the principal ray and the correction of these will become difficult.

Also, when the RCL is to be mounted on an objective lens which is not so bright, i.e., not great in relative aperture, it is desirable that the following condition be added to condition (8):

$$q_1 < -1$$

That is, it is desirable that the following condition be satisfied:

$$-1.5 < q_1 < -1 \quad (9)$$

When this condition (9) is satisfied, the positive lens L1 is a positive meniscus lens having its convex surface facing the image side and there is provided an RCL which is small in off-axis aberrations, particularly astigmatic difference.

Each embodiment of the rear conversion lens (RCL) according to the present invention will now be described in greater detail. The numerical data of the standard objective lens used for the evaluation of the imaging performance of the RCL of each embodiment will first be shown in Table 1 below.

FIG. 5 shows the construction of an optical system comprising the standard objective lens ML and the RCL of a first embodiment (see FIG. 1) mounted on the image side of the standard objective lens ML, during the infinity in-focus. The standard objective lens ML comprises, in succession from the object side, protective glass M1, a positive meniscus lens M2 having its convex surface facing the object side, a biconvex lens M3, a biconcave lens M4, a cemented positive lens M5 comprising a negative meniscus lens M51 having its convex surface facing the object side and a positive meniscus lens M52 having its convex surface facing the object side, the lenses M51 and M52 being cemented together, a cemented negative lens M6 comprising a positive meniscus lens M61 having its convex surface facing the image side and a biconcave lens M62, the lenses M61 and M62 being cemented together, a biconvex lens M7, a biconvex lens M8, a negative meniscus lens M9 having its convex surface facing the image side, a positive meniscus lens M10 having its convex surface facing the image side, a stop S and protective glass M11.

The standard objective lens ML has a focal length of 294 mm and F-number 2.9, and the numerical data of the respective lenses thereof are set as shown in Table 1 below. In succession from the object side, the radius of curvature of the ith surface (i=1, 2, ...) is $R_i$, the surface spacing between the ith surface and the (i+1)th surface is Wi, the Abbe number of the medium between the ith surface and the (i+1)th surface is $\nu_{di}$, and the refractive index of the medium between the ith surface and the (i+1)th surface for d-line is $n_{di}$. In Table 1, the last surface spacing W24 is equal to the distance d0 between the last surface of the standard objective lens ML and the foremost surface of the RCL mounted on the objective lens, and the values shown in Table 1 are values for the RCL of the first embodiment. The stop S is disposed 19.2 mm ahead of the 23rd surface.

TABLE 1

(Standard Objective Lens ML)

| i | Ri | Wi | $\nu_{di}$ | $n_{di}$ |
|---|---|---|---|---|
| 1 | ∞ | 4.0000 | 64.12 | 1.51680 |
| 2 | ∞ | 0.6000 | | |
| 3 | 117.2149 | 14.4000 | 82.56 | 1.49782 |
| 4 | 9900.1393 | 0.3000 | | |
| 5 | 121.6819 | 16.8000 | 82.56 | 1.49782 |
| 6 | −409.9357 | 4.1000 | | |
| 7 | −335.1684 | 4.7000 | 35.19 | 1.74950 |
| 8 | 478.7001 | 34.7201 | | |
| 9 | 105.7846 | 3.5000 | 55.61 | 1.69600 |
| 10 | 35.5470 | 14.4000 | 67.87 | 1.59319 |
| 11 | 180.4641 | 5.0414 | | |
| 12 | −13034.1170 | 6.6000 | 33.89 | 1.80384 |
| 13 | −80.5737 | 2.3000 | 61.68 | 1.58913 |
| 14 | 119.9994 | 5.1000 | | |
| 15 | −174.1887 | 2.3000 | 57.58 | 1.67025 |
| 16 | 65.0696 | 15.9559 | | |
| 17 | 147.2978 | 7.6000 | 82.56 | 1.49782 |
| 18 | −71.7509 | 2.5000 | | |
| 19 | −54.4162 | 2.3000 | 25.49 | 1.80450 |
| 20 | −175.6164 | 9.4000 | | |
| 21 | −269.7710 | 5.4000 | 28.27 | 1.74000 |
| 22 | −66.8426 | 33.6000 | | |
| 23 | ∞ | 2.0000 | 64.12 | 1.51680 |
| 24 | ∞ | 30.0000(d0) | | |

The RCL will now be described with respect to each embodiment thereof, and in succession from the object side, the radius of curvature of the ith surface (i=1, 2, ...) is $r_i$, the surface spacing between the ith surface and the (i+1)th surface is di, the Abbe number between the ith surface and the (i+1)th surface is $\nu_{di}$, and the refractive index of the medium between the ith surface and the (i+1)th surface for d-line is $n_{di}$. Also, the spacing between the last surface of the standard objective lens ML and the foremost surface (the first surface) of each embodiment is d0, and the back focal length of the composite system of the standard objective lens ML and each RCL is Bf'. Further, the focal length of the entire system of each RCL is $r_R$, the focal length of the first lens unit G1 is $f_1$, the focal length of the second lens unit G2 is $f_2$, the focal length of the third lens unit G3 is $f_3$, the air gap between the first lens unit G1 and the second lens unit G2 is $D_1$, the air gap between the second lens unit G2 and the third lens unit G3 is $D_2$, and the enlargement magnification by each RCL is $\beta$.

Figure 1:
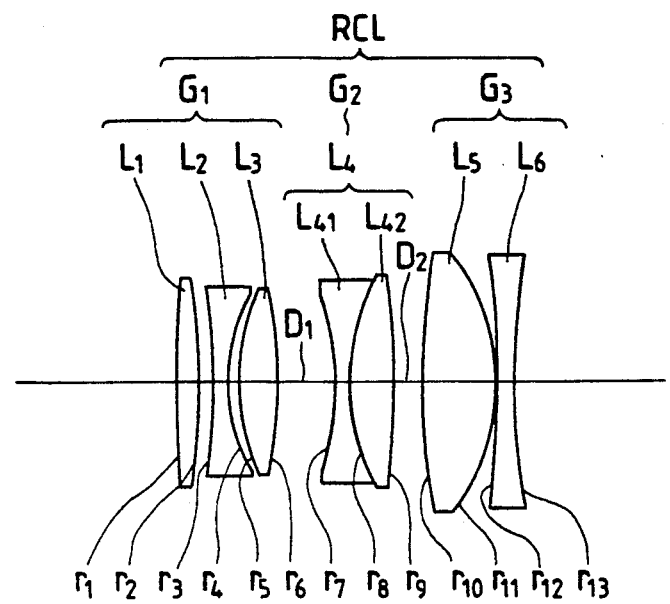
FIG. 1 is a lens construction view showing an RCL according to a first embodiment of the present invention.

FIG. 1 is a lens construction view of an RCL according to a first embodiment.

As shown in FIG. 1, the RCL according to the first embodiment comprises, in succession from the standard objective lens side, a first lens unit G1 of positive refractive power, a second lens unit G2 of negative refractive power and a third lens unit G3 of positive refractive power. Also, in succession from the standard objective lens side, the first lens unit G1 comprises a positive biconvex lens L1, a negative biconcave lens L2 and a positive biconvex lens L3, the second lens unit G2 comprises only a cemented negative lens L4 comprising a negative biconcave lens L41 and a positive biconvex lens L42 cemented together and having its convex surface facing the image side, and the third lens unit G3 comprises a positive biconvex lens L5 and a negative biconcave lens L6. The numerical data of this first embodiment will be shown in Table 2 below.

TABLE 2

(First Embodiment)

$\beta = 2.0$
$d_0 \times 30.0000$

TABLE 2-continued (First Embodiment)

$f_R = -96.597$
$f_1 = 765.810$
$f_2 = -38.506$
$f_3 = 87.455$

| i | ri | di | $v_{di}$ | $n_{di}$ |
|---|---|---|---|---|
| 1 | 171.6366 | 3.0000 | 38.12 | 1.60342 |
| 2 | −77.1275 | 2.0000 | | |
| 3 | −84.3980 | 2.0000 | 45.42 | 1.79668 |
| 4 | 22.4963 | 1.5000 | | |
| 5 | 26.7257 | 5.1000 | 35.51 | 1.59507 |
| 6 | −57.4817 | 7.8000(D$_1$) | | |
| 7 | −39.4253 | 2.0000 | 43.30 | 1.84042 |
| 8 | 24.9311 | 6.0000 | 41.55 | 1.57501 |
| 9 | −105.6051 | 3.9000(D$_2$) | | |
| 10 | 84.0445 | 10.0000 | 70.24 | 1.48749 |
| 11 | −25.8484 | 0.2000 | | |
| 12 | −139.9927 | 2.5000 | 52.28 | 1.74810 |
| 13 | 94.2001 | 57.75(Bf') | | |

Figure 2:
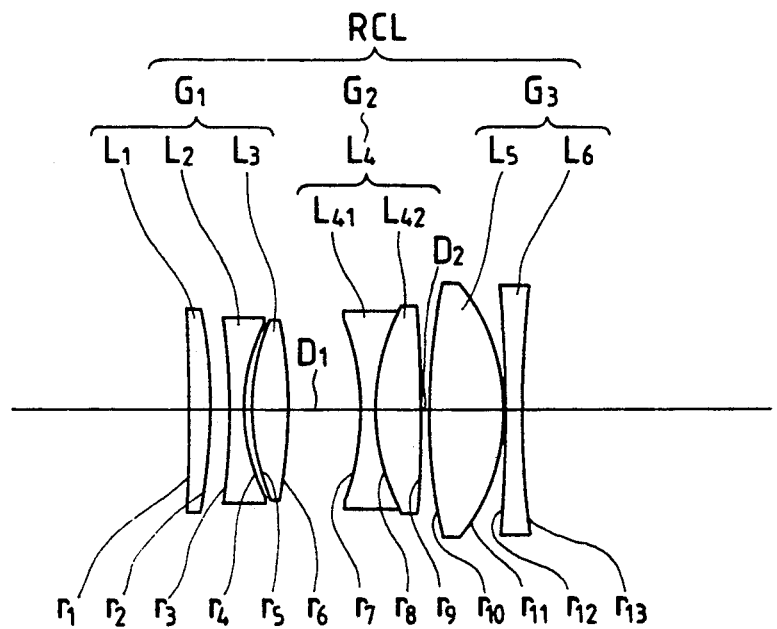
FIG. 2 is a lens construction view showing an RCL according to a second embodiment of the present invention.

FIG. 2 is a lens construction view of an RCL according to a second embodiment.

As shown in FIG. 2, the RCL according to the second embodiment comprises, in succession from the standard objective lens side, a first lens unit G1 of negative refractive power, a second lens unit G2 of negative refractive power and a third lens unit G3 of positive refractive power. Also, in succession from the standard objective lens side, the first lens unit G1 comprises a positive meniscus lens L1 having its convex surface facing the image side, a negative biconcave lens L2 and a positive biconvex lens L3, the second lens unit G2 comprises only a negative cemented meniscus lens L4 comprising a negative biconcave lens L41 and a positive biconvex lens L42 cemented together and having its convex surface facing the image side, and the third lens unit G3 comprises a positive biconvex lens L5 and a negative biconcave lens L6. The numerical data of this second embodiment will be shown in Table 3 below.

TABLE 3

(Second Embodiment)

$\beta = 2.0$
$d_0 \times 29.5000$
$f_R = -109.317$
$f_1 = -1009.625$
$f_2 = -33.350$
$f_3 = 58.039$

| i | ri | di | $v_{di}$ | $n_{di}$ |
|---|---|---|---|---|
| 1 | −606.3674 | 3.0000 | 38.12 | 1.60342 |
| 2 | −64.7486 | 2.5000 | | |
| 3 | −83.1536 | 2.0000 | 45.42 | 1.79668 |
| 4 | 24.0359 | 1.0000 | | |
| 5 | 29.3000 | 5.0000 | 36.99 | 1.61293 |
| 6 | −56.8146 | 9.8000(D$_1$) | | |
| 7 | −32.7763 | 2.0000 | 43.30 | 1.84042 |
| 8 | 27.6556 | 6.0000 | 38.12 | 1.60342 |
| 9 | −156.3495 | 1.0000(D$_2$) | | |
| 10 | 70.2903 | 10.0000 | 60.34 | 1.51835 |
| 11 | −26.2118 | 0.2000 | | |
| 12 | −250.0000 | 2.5000 | 43.30 | 1.84042 |
| 13 | 133.0628 | 63.04(Bf') | | |

FIG. 3 is a lens construction view of an RCL according to a third embodiment.

As shown in FIG. 3, the RCL according to the third embodiment comprises, in succession from the standard objective lens side, a first lens unit G1 of negative refractive power, a second lens unit G2 of negative refractive power and a third lens unit G3 of positive refractive power. Also, in succession from the standard objective lens side, the first lens unit G1 comprises a positive biconvex lens L1, a negative biconcave lens L2 and a positive biconvex lens L3, the second lens unit G2 comprises only a negative cemented meniscus lens L4 comprising a negative biconcave lens L41 and a positive biconvex lens L42 cemented together and having its convex surface facing the image side, and the third lens unit G3 comprises a positive biconvex lens L5 and a negative biconcave lens L6. The numerical data of this third embodiment will be shown in Table 4 below.

TABLE 4

(Third Embodiment)

$\beta = 2.0$
$d_0 \times 20.0000$
$f_R = -159.237$
$f_1 = -391.635$
$f_2 = -39.039$
$f_3 = 64.344$

| i | ri | di | $v_{di}$ | $n_{di}$ |
|---|---|---|---|---|
| 1 | 269.2878 | 3.0000 | 35.51 | 1.59507 |
| 2 | −88.9296 | 5.3718 | | |
| 3 | −91.3276 | 2.0000 | 45.42 | 1.79668 |
| 4 | 23.1208 | 1.0000 | | |
| 5 | 27.1235 | 5.0000 | 35.51 | 1.59507 |
| 6 | −75.3031 | 6.5887(D$_1$) | | |
| 7 | −38.6105 | 2.0000 | 43.30 | 1.84042 |
| 8 | 28.3545 | 5.5000 | 41.55 | 1.57501 |
| 9 | −113.6458 | 5.3967(D$_2$) | | |
| 10 | 96.8950 | 10.0000 | 70.24 | 1.48749 |
| 11 | −27.6202 | 0.2000 | | |
| 12 | −353.8109 | 2.5000 | 47.53 | 1.78797 |
| 13 | 167.2263 | 82.67(Bf') | | |

FIG. 4 is a lens construction view of an RCL according to a fourth embodiment.

As shown in FIG. 4, the RCL according to the fourth embodiment comprises, in succession from the standard objective lens side, a first lens unit G1 of positive refractive power, a second lens unit G2 of negative refractive power and a third lens unit G3 of positive refractive power. Also, in succession from the standard objective lens side, the first lens unit G1 comprises a positive biconvex lens L1, a negative biconcave lens L2 and a positive biconvex lens L3, the second lens unit G2 comprises only a negative cemented meniscus lens L4 comprising a negative biconcave lens L41 and a positive biconvex lens L42 cemented together and having its convex surface facing the image side, and the third lens unit G3 comprises a positive biconvex lens L5 and a negative biconcave lens L6. The numerical data of this fourth embodiment will be shown in Table 5 below.

TABLE 5

(Fourth Embodiment)

$\beta = 2.0$
$d_0 \times 30.0000$
$f_R = -84.235$
$f_1 = 415.181$
$f_2 = -37.067$
$f_3 = 96.902$

| i | ri | di | $v_{di}$ | $n_{di}$ |
|---|---|---|---|---|
| 1 | 135.6123 | 2.6000 | 35.51 | 1.59507 |
| 2 | −165.4203 | 2.0000 | | |
| 3 | −285.1216 | 2.0000 | 43.30 | 1.84042 |
| 4 | 23.1622 | 1.0000 | | |
| 5 | 27.1254 | 8.0000 | 35.51 | 1.59507 |
| 6 | −58.5180 | 8.0000(D$_1$) | | |
| 7 | −35.8084 | 2.0000 | 43.30 | 1.84042 |
| 8 | 28.3504 | 5.5000 | 42.69 | 1.56732 |
| 9 | −101.7495 | 3.9000(D$_2$) | | |
| 10 | 102.0509 | 10.0000 | 54.62 | 1.51454 |
| 11 | −26.5884 | 0.2000 | | |
| 12 | −407.3539 | 2.5000 | 43.30 | 1.84042 |

TABLE 5-continued (Fourth Embodiment)

| 13 | 68.4643 | 52.82(Bf) |

In the present invention, it is desirable that conditions (1) and (2) be satisfied and conditions (3) to (5) be satisfied. It is desirable that conditions (6) to (8) be further satisfied. So, the data of each embodiment regarding those conditions (1) to (8) will be collectively shown in Table 6 below. In Table 6, $\Sigma d$ is the on-axis lens thickness from the first lens surface to the last lens surface of the RCL, $\nu-$ is the lowest Abbe number in the negative lenses constituting the RCL, $n-$ is the highest refractive index in the negative lenses constituting the RCL for d-line, and $q_1$ is the shape factor of the positive lens L1 most adjacent to the standard objective lens side.

TABLE 6

| | (Condition-Corresponding Numerical Values) | | | |
|---|---|---|---|---|
| | 1st Embodiment | 2nd Embodiment | 3rd Embodiment | 4th Embodiment |
| $D_1/\Sigma d$ | 0.1696 | 0.2178 | 0.1357 | 0.1677 |
| $\|D_2/f_R\|$ | 0.04 | 0.0091 | 0.03389 | 0.0463 |
| $f_1/f_R$ | −7.93 | 9.24 | 2.46 | 4.92881 |
| $\|f_2/f_R\|$ | 0.399 | 0.305 | 0.245 | 0.44004 |
| $\|f_3/f_R\|$ | 0.905 | 0.531 | 0.404 | 1.1504 |
| $\nu-$ | 43.30 | 43.30 | 43.30 | 43.30 |
| $n-$ | 1.84042 | 1.84042 | 1.84042 | 1.84042 |
| $q_1$ | −0.3799 | −1.239 | −0.503 | −0.099 |

Any of the above-described embodiments is an RCL of relatively high magnification of $\beta=2$, and yet maintains an excellent imaging performance even if it is mounted on a bright telephoto objective lens of F-number 2.9. Also, at this time, F-number as a whole is 5.8 which is exactly a double value, and there is no loss of the light beam in fully open aperture.

Of course, the present invention is not restricted to the above-described embodiments, but may assume various constructions without departing from the gist of the present invention.

According to the present invention, predetermined conditions (1) and (2) are imposed on the air gap between the first lens unit and the second lens unit and the air gap between the second lens unit and the third lens unit, respectively, and therefore, there can be provided a rear conversion lens of high performance which can be mounted even on a telephoto objective lens which is of a relatively high magnification and yet is bright. Also, the rear conversion lens of the present invention does not intercept a light beam even in the fully open state of the aperture and has a good imaging performance even in the marginal area of the image field.

Also, when predetermined conditions (3) to (5) are imposed on the focal lengths of the first to third lens units, respectively, spherical aberration, astigmatism and curvature of image field can be corrected better.

What is claimed is:

1. A rear conversion lens adapted to be mounted on the image side of an objective lens and having negative refractive power for enlarging the combined focal length of itself and said objective lens, said rear conversion lens including, in succession from said objective lens side, a first lens unit having a positive lens component most adjacent to the object side and having positive or negative refractive power as a whole, a second lens unit having negative refractive power, and a third lens unit having positive refractive power, said rear conversion lens, when the air gap between said first lens unit and said second lens unit is $D_1$ and the air gap between said second lens unit and said third lens unit is $D_2$, being designed to satisfy the following conditions:

$$0.13 < D_1/\Sigma d < 0.25$$

$$0.005 < |D_2/f_R| < 0.05,$$

where
$\Sigma d$: the on-axis lens thickness from the first surface to the last surface of the entire rear conversion lens;
$f_R$: the focal length of the entire rear conversion lens.

2. A rear conversion lens according to claim 1, wherein when the focal length of said first lens unit is $f_1$ and the focal length of said second lens unit is $f_2$ and the focal length of said third lens unit is $f_3$ and the focal length of the entire rear conversion lens is $f_R$, said first lens unit, said second lens unit and said third lens unit are designed to further satisfy the following conditions:

$$-10 < f_1/f_R < 10$$

$$0.2 < |f_2/f_R| < 0.5$$

$$0.3 < |f_3/f_R| < 1.2$$

3. A rear conversion lens according to claim 1, wherein said first lens unit, said second lens unit and said third lens unit each include a negative lens component, and when the value of the lowest one of the Abbe numbers $\nu d$ of said negative lens components is $\nu-$, said three lens units are designed to further satisfy the following condition:

$$\nu- > 42.5$$

where when the refractive index for d-line (587.6 nm) is nd and the refractive index for F-line (486.1 nm) is $n_F$ and the refractive index for C-line (656.3 nm) is $n_C$, the Abbe numbers $\nu d$ are defined as follows.

$$\nu d = (nd-1)/(n_F - n_C).$$

4. A rear conversion lens according to claim 1, wherein said first lens unit, said second lens unit and said third lens unit each include a negative lens component, and when the value of the highest one of the refractive indices nd of said negative lens components for d-line (587.6 nm) is $n-$, said three lens units are designed to further satisfy the following condition:

$$n- > 1.82$$

5. A rear conversion lens according to claim 1, wherein when the radius of curvature of that surface of said positive lens component in said first lens unit provided most adjacent to the object side which is adjacent to the object side is $r_1$ and the radius of curvature of that surface of said positive lens component which is adjacent to the image side is $r_2$ and the shape factor $q_1$ of said positive lens component is defined as $$q_1 = (r_2 + r_1)/(r_2 - r_1),$$

said positive lens component is designed to satisfy the following condition:

$$-1.5 < q_1 < 0$$

6. A rear conversion lens according to claim 1, wherein said positive lens component in said first lens unit which is provided most adjacent to the object side is a positive meniscus lens having its convex surface facing the image side, and when the radius of curvature of that surface of said positive lens component which is adjacent to the object side is $r_1$ and the radius of curvature of that surface of said positive lens component which is adjacent to the image side is $r_2$ and the shape factor $q_1$ of said positive lens component is defined as $$q_1 = (r_2 + r_1)/(r_2 - r_1),$$

said positive lens component is designed to satisfy the following condition:

$$-1.5 < q_2 < -1$$

7. A rear conversion lens according to claim 1, wherein said first lens unit comprises, in succession from the object side, a biconvex lens, a biconcave lens and a biconvex lens and has positive refractive power as a whole, said second lens unit comprises only a negative cemented meniscus lens comprising a biconcave lens and a biconvex lens cemented together and having its convex surface facing the image side, and said third lens unit comprises, in succession from the object side, a biconvex lens and a biconcave lens and has positive refractive power as a whole.

8. A rear conversion lens according to claim 1, wherein said first lens unit comprises, in succession from the object side, a positive meniscus lens having its convex surface facing the image side, a biconcave lens and a biconvex lens and has negative refractive power as a whole, said second lens unit comprises only a negative cemented meniscus lens comprising a biconcave lens and a biconvex lens cemented together and having its convex surface facing the image side, and said third lens unit comprises, in succession from the object side, a biconvex lens and a biconcave lens and has positive refractive power as a whole.

9. A rear conversion lens according to claim 1, wherein said first lens unit comprises, in succession from the object side, a biconvex lens, a biconcave lens and a biconvex lens and has negative refractive power as a whole, said second lens unit comprises only a negative cemented meniscus lens comprising a biconcave lens and a biconvex lens cemented together and having its convex surface facing the image side, and said third lens unit comprises, in succession from the object side, a biconvex lens and a biconcave lens and has positive refractive power as a whole.

10. A rear conversion lens according to claim 1, having the following numerical data:

$\beta = 2.0$
$d0 = 30.0000$
$f_R = -96.597$
$f_1 = 765.810$
$f_2 = -38.506$
$f_3 = 87.455$

| i | ri | di | $\nu_{di}$ | $n_{di}$ |
|---|---|---|---|---|
| 1 | 171.6366 | 3.0000 | 38.12 | 1.60342 |
| 2 | −77.1275 | 2.0000 | | |
| 3 | −84.3980 | 2.0000 | 45.42 | 1.79668 |
| 4 | 22.4963 | 1.5000 | | |
| 5 | 26.7257 | 5.1000 | 35.51 | 1.59507 |
| 6 | −57.4817 | 7.8000($D_1$) | | |
| 7 | −39.4253 | 2.0000 | 43.30 | 1.84042 |
| 8 | 24.9311 | 6.0000 | 41.55 | 1.57501 |
| 9 | −105.6051 | 3.9000($D_2$) | | |
| 10 | 84.0445 | 10.0000 | 70.24 | 1.48749 |
| 11 | −25.8484 | 0.2000 | | |
| 12 | −139.9927 | 2.5000 | 52.28 | 1.74810 |
| 13 | 94.2001 | 57.75(Bf') | | | where in succession from the object side, ri is the radius of curvature of the ith surface (i=1, 2, ...), di is the surface spacing between the ith surface and the (i+1)th surface, $\nu_{di}$ is the Abbe number between the ith surface and the (i+1)th surface, ndi is the refractive index of the medium between the ith surface and the (i+1)th surface for d-line, d0 is the spacing between the last surface of the objective lens and the foremost surface (the first surface), Bf' is the back focal length of the composite system of the objective lens and the rear conversion lens, $f_R$ is the focal length of the entire system, $f_1$ is the focal length of the first lens unit, $f_2$ is the focal length of the second lens unit, $f_3$ is the focal length of the third lens unit, $D_1$ is the air gap between the first lens unit and the second lens unit, $D_2$ is the air gap between the second lens unit and the third lens unit, and $\beta$ is the enlargement magnification.

11. A rear conversion lens according to claim 1, having the following numerical data:

| | $\beta = 2.0$ | | |
| | $d_0 \times 29.5000$ | | |
| | $f_R = -109.317$ | | |
| | $f_1 = -1009.625$ | | |
| | $f_2 = -33.350$ | | |
| | $f_3 = 58.039$ | | |
| i | ri | di | $\nu_{di}$ | $n_{di}$ |
|---|---|---|---|---|
| 1 | −606.3674 | 3.0000 | 38.12 | 1.60342 |
| 2 | −64.7486 | 2.5000 | | |
| 3 | −83.1536 | 2.0000 | 45.42 | 1.79668 |
| 4 | 24.0359 | 1.0000 | | |
| 5 | 29.3000 | 5.0000 | 36.99 | 1.61293 |
| 6 | −56.8146 | 9.8000($D_1$) | | |
| 7 | −32.7763 | 2.0000 | 43.30 | 1.84042 |
| 8 | 27.6556 | 6.0000 | 38.12 | 1.60342 |
| 9 | −156.3495 | 1.0000($D_2$) | | |
| 10 | 70.2903 | 10.0000 | 60.34 | 1.51835 |
| 11 | −26.2118 | 0.2000 | | |
| 12 | −250.0000 | 2.5000 | 43.30 | 1.84042 |
| 13 | 133.0628 | 63.04(Bf') | | | where in succession from the object side, ri is the radius of curvature of the ith surface (i=1, 2, ...), di is the surface spacing between the ith surface and the (i+1)th surface, $\nu_{di}$ is the Abbe number between the ith surface and the (i+1)th surface, $n_{di}$ is the refractive index of the medium between the ith surface and the (i+1)th surface for d-line, d0 is the spacing between the last surface of the objective lens and the foremost surface (the first surface), Bf' is the back focal length of the composite system of the objective lens and the rear conversion lens, $f_R$ is the focal length of the entire system, $f_1$ is the focal length of the first lens group, $f_2$ is the focal length of the second lens unit, $f_3$ is the focal length of the third lens unit, $D_1$ is the air gap between the first lens unit and the second lens unit, $D_2$ is the air gap between the second lens unit and the third lens unit, and $\beta$ is the enlargement magnification.

12. A rear conversion lens according to claim 1, having the following numerical data:

$\beta = 2.0$
$d_0 = 20.0000$
$f_R = -159.237$
$f_1 = -391.635$
$f_2 = -39.039$
$f_3 = 64.344$

| i | ri | di | $\nu_{di}$ | $n_{di}$ |
|---|---|---|---|---|
| 1 | 269.2878 | 3.0000 | 35.51 | 1.59507 |
| 2 | −88.9296 | 5.3718 | | |
| 3 | −91.3276 | 2.0000 | 45.42 | 1.79668 |
| 4 | 23.1208 | 1.0000 | | |
| 5 | 27.1235 | 5.0000 | 35.51 | 1.59507 |
| 6 | −75.3031 | 6.5887($D_1$) | | |
| 7 | −38.6105 | 2.0000 | 43.30 | 1.84042 |
| 8 | 28.3545 | 5.5000 | 41.55 | 1.57501 |
| 9 | −113.6458 | 5.3967($D_2$) | | |
| 10 | 96.8950 | 10.0000 | 70.24 | 1.48749 |
| 11 | −27.6202 | 0.2000 | | |
| 12 | −353.8109 | 2.5000 | 47.53 | 1.78797 |
| 13 | 167.2263 | 82.67(Bf′) | | | where in succession from the object side, ri is the radius of curvature of the ith surface (i=1, 2, ...), di is the surface spacing between the ith surface and the (i+1)th surface, $\nu_{di}$ is the Abbe number between the ith surface and the (i+1)th surface, $n_{di}$ is the refractive index of the medium between the ith surface and the (i+1)th surface for d-line, d0 is the spacing between the last surface of the objective lens and the foremost surface (the first surface), Bf′ is the back focal length of the composite system of the objective lens and the rear conversion lens, $f_R$ is the focal length of the entire system, $f_1$ is the focal length of the first lens unit, $f_2$ is the focal length of the second lens unit, $f_3$ is the focal length of the third lens unit, $D_1$ is the air gap between the first lens unit and the second lens unit, $D_2$ is the air gap between the second lens unit and the third lens unit, and $\beta$ is the enlargement magnification.

13. A rear conversion lens according to claim 1, having the following numerical data:

$\beta = 2.0$
$d_0 \times 30.0000$
$f_R = -84.235$
$f_1 = 415.181$
$f_2 = -37.067$
$f_3 = 96.902$

| i | ri | di | $\nu_{di}$ | $n_{di}$ |
|---|---|---|---|---|
| 1 | 135.6123 | 2.6000 | 35.51 | 1.59507 |
| 2 | −165.4203 | 2.0000 | | |
| 3 | −285.1216 | 2.0000 | 43.30 | 1.84042 |
| 4 | 23.1622 | 1.0000 | | |
| 5 | 27.1254 | 8.0000 | 35.51 | 1.59507 |
| 6 | −58.5180 | 8.0000($D_1$) | | |
| 7 | −35.8084 | 2.0000 | 43.30 | 1.84042 |
| 8 | 28.3504 | 5.5000 | 42.69 | 1.56732 |
| 9 | −101.7495 | 3.9000($D_2$) | | |
| 10 | 102.0509 | 10.0000 | 54.62 | 1.51454 |
| 11 | −26.5884 | 0.2000 | | |
| 12 | −407.3539 | 2.5000 | 43.30 | 1.84042 |
| 13 | 68.4643 | 52.82(Bf′) | | | where in succession from the object side, ri is the radius of curvature of the ith surface (i=1, 2, ...), di is the surface spacing between the ith surface and the (i+1)th surface, $\nu_{di}$ is the Abbe number between the ith surface and the (i+1)th surface, $n_{di}$ is the refractive index of the medium between the ith surface and the (i+1)th surface for d-line, d0 is the spacing between the last surface of the objective lens and the foremost surface (the first surface), Bf′ is the back focal length of the composite system of the objective lens and the rear conversion lens, $f_R$ is the focal length of the entire system, $f_1$ is the focal length of the first lens unit, $f_2$ is the focal length of the second lens unit, $f_3$ is the focal length of the third lens unit, $D_1$ is the air gap between the first lens unit and the second lens unit, $D_2$ is the air gap between the second lens unit and the third lens unit, and $\beta$ is the enlargement magnification.

* * * * *